(12) United States Patent
Lawrence (10) Patent No.: US 8,746,133 B2
(45) Date of Patent: *Jun. 10, 2014

(54) VACUUM PRESSING PLATEN ASSEMBLY AND METHOD FOR ADJUSTMENT

(75) Inventor: Eric Lawrence, Huntington Beach, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 12/434,099

(22) Filed: May 1, 2009

(65) Prior Publication Data

US 2009/0272277 A1    Nov. 5, 2009

Related U.S. Application Data

(60) Provisional application No. 61/049,685, filed on May 1, 2008.

(51) Int. Cl.
*A47J 37/06* (2006.01)
*A21C 9/00* (2006.01)
*A21C 11/00* (2006.01)

(52) U.S. Cl.
CPC .. *A21C 9/00* (2013.01); *A21C 11/00* (2013.01)
USPC ............................................. 99/349; 100/349

(58) Field of Classification Search
USPC .................. 99/349, 334; 72/405.06; 426/231; 425/406; 277/611; 100/315.295
See application file for complete search history.

(56) References Cited

U.S. PATENT DOCUMENTS

| 1,016,258 | A | * | 2/1912 | Francis | 100/229 R |
| 1,379,816 | A | * | 5/1921 | Haskel | 283/115 |
| 1,746,412 | A | | 2/1930 | Crawford | 384/423 |
| 1,748,412 | A | * | 2/1930 | Crawford | 384/423 |
| 2,018,736 | A | * | 10/1935 | Norris | 267/113 |
| 2,614,590 | A | * | 10/1952 | Hervey | 100/196 |
| 2,814,590 | A | | 10/1952 | Hervey | 100/196 |
| 2,858,850 | A | | 11/1955 | O'Donnell | 100/295 |

(Continued)

FOREIGN PATENT DOCUMENTS

| EP | 0323565 A1 | 7/1989 |
| EP | 1219174 A1 | 7/2002 |
| WO | WO2003030648 A1 | 4/2003 |
| WO | WO2009135123 A3 | 6/2010 |

OTHER PUBLICATIONS

English Abstract for EP 323565 A1.*

(Continued)

*Primary Examiner* — Gene Kim
*Assistant Examiner* — M Chambers
(74) *Attorney, Agent, or Firm* — Fish & Richardson P.C.

(57) ABSTRACT

A dough forming apparatus comprising a lower support frame, a lower pressing platen coupled to the lower support frame, and an upper pressing platen assembly positioned above the lower pressing platen. The upper pressing platen assembly further comprises a backing structure, an upper backing platen coupled to the backing structure, and a pressing plate removably coupled to the upper backing platen by vacuum or electromagnetic means. Means for heating the pressing plate, and shims for adjusting the flatness of the pressing surface are provided. A conveyor supported by the lower support frame is positioned to pass between the lower pressing platen and the upper pressing platen assembly. A method of adjusting the apparatus is also disclosed.

25 Claims, 9 Drawing Sheets

(56) References Cited

U.S. PATENT DOCUMENTS

| | | | |
|---|---|---|---|
| 2,858,860 A * | 11/1958 | O'Donnell | 100/295 |
| 3,104,574 A * | 9/1963 | Andersen et al. | 83/167 |
| 3,104,874 A | 9/1963 | Andersen et al. | 83/167 |
| 3,382,530 A | 4/1965 | Glesner | |
| 3,398,679 A | 4/1967 | Grivet | |
| 3,321,807 A | 5/1967 | O'Brien | |
| 3,619,310 A * | 11/1971 | Clarke | 228/155 |
| 3,956,058 A * | 5/1976 | Wemhoener | 156/583.1 |
| 3,980,016 A * | 9/1976 | Taylor | 100/295 |
| 4,053,276 A * | 10/1977 | Ahrweiler et al. | 425/406 |
| 4,116,119 A | 9/1978 | Kuhlman | |
| 4,164,387 A * | 8/1979 | Schermutzki et al. | 425/371 |
| 4,417,867 A | 11/1983 | Bauer | |
| 4,753,160 A * | 6/1988 | Baird et al. | 100/315 |
| 4,769,106 A | 9/1988 | Busching | |
| 4,776,789 A | 10/1988 | Ehrich | |
| 4,905,581 A | 3/1990 | Kirkpatrick | |
| 4,938,126 A | 7/1990 | Rubio et al. | |
| 5,006,358 A | 4/1991 | Ribio et al. | |
| 5,231,919 A | 8/1993 | Lawrence et al. | |
| RE34,530 E | 2/1994 | Kirkpatrick | |
| 5,300,170 A | 4/1994 | Donohoe | |
| 5,649,473 A | 7/1997 | Lawrence | |
| 5,918,533 A | 7/1999 | Lawrence et al. | |
| 6,083,083 A | 7/2000 | Nishimura | |
| 6,112,647 A | 9/2000 | Brunner et al. | |
| 6,244,167 B1 | 6/2001 | McCarney | |
| 6,244,941 B1 * | 6/2001 | Bowman et al. | 451/287 |
| 6,250,217 B1 | 6/2001 | Korybutiak | |
| 6,302,767 B1 | 10/2001 | Tietz | |
| 6,398,539 B1 * | 6/2002 | Lawrence | 425/364 R |
| 6,638,553 B2 | 10/2003 | Bell et al. | |
| 6,835,118 B2 * | 12/2004 | Berkstresser et al. | 451/28 |
| 7,067,167 B2 | 6/2006 | Damsgard et al. | |
| 7,086,325 B2 | 8/2006 | Armstrong | |
| 7,229,270 B2 | 6/2007 | Schultz | |
| 7,435,593 B2 * | 10/2008 | Park et al. | 435/396 |
| 2003/0066436 A1 | 4/2003 | Bell et al. | |
| 2005/0287240 A1 | 12/2005 | Mattias et al. | |
| 2006/0162515 A1 | 7/2006 | Vogeley et al. | |
| 2007/0045232 A1 | 3/2007 | Murai et al. | |
| 2009/0272277 A1 * | 11/2009 | Lawrence | 99/349 |
| 2012/0114812 A1 | 5/2012 | Lawrence | |

OTHER PUBLICATIONS

Webpage Download, Amazon magnetic dato shims, 2007, www.amazon.com/Systi-Matic-56060-Magnetic-Dado-Shims/dp/B000HDVTXM, 3 pages.*

Webpage download, Smalley, 2008, www.smalley.com/retaining_rings/about_retaining_rings.asp, 2 pages.*

English Translation of EP0323565A1, www.google.com/patents/EP0323565A1?cl=en, 23 pages.*

"42 Inch Shimming Procedures," Lawrence Equipment, Jan. 2009, 13 pages.

"52 Inch Shimming Procedures," Lawrence Equipment, Jan. 2009, 18 pages.

"Shimming Procedures," Lawrence Equipment, Oct. 2010, 4 pages.

International Search Report and Written Opinion in PCT/US2011/059348, dated Apr. 3, 2012, 15 pages.

CasaHerrera, CH-51 Automated Inspection Systems, [Online], Retrieved from the Internet at http://www.casaherrera.com/machine-tortilla-flatbread-automated-inespection-systems on Nov. 9, 2010, 3 pages.

CasaHerrera, CH-51 Automated Inspection Systems, [Online], Retrieved from the Internet at http://www.casaherrera.com/managedocs/download.php?doc=brochure_vision-system_CH-51-Fiour.pdf on Nov. 9, 2010, 2 pages. Dated Jan. 22, 2010.

International Search Report and Written Opinion in PCT/US2009/042519, dated Apr. 27, 2010.

English Abstract for EP 323585 A1, 2012, 1 page.

English Translation of EP0323565A1. www.google.com/patents/EP0323565A1?cl=en, 23 pages, 2014.

* cited by examiner

VACUUM PRESSING PLATEN ASSEMBLY AND METHOD FOR ADJUSTMENT

CROSS-REFERENCE TO RELATED APPLICATIONS

The present application claims the benefit of U.S. Provisional Patent Application No. 61/049,685 titled "Vacuum Pressing Platen Assembly and Method for Adjustment" filed May 1, 2008, the content of which is incorporated by reference in this disclosure in its entirety.

BACKGROUND OF THE INVENTION

1. Field of the Invention

The present invention is directed to a food press having a platen that moves up and down to press doughballs on a conveyor, and more particularly to a food press for tortillas.

2. Description of Related Art

In making food products, such as tortillas, doughballs are typically flattened by a press unit. The doughballs are generally moved on a conveyor belt to and through the press unit. When the doughballs are properly positioned in the press unit, an upper pressing platen is moved downwardly with an appropriate force and spacing from a lower pressing platen to press the dough balls to a desired thickness and shape.

Typically, one or both of the pressing platens are heated for parbaking the dough balls to maintain a flattened condition and proper texture. Following pressing, the upper pressing platen is raised and the conveyor belt is advanced to move the flattened dough balls from the press and to advance new dough balls to the press for repeating the cycle.

In a typical prior art system, the upper platen has a pressing/heating plate, a backing structure (which is typically an insulation plate, and a supporting framework) and a Teflon platen cover in some way attached to the pressing/heating plate. Unless precision is achieved in the flatness of the pressing surface, the pressed dough does not have a uniform circumference. To achieve the necessary tolerances, thin shims are placed between the pressing/heating plate and the insulation plate. Since the plates are bolted to a frame, the task of placing, removing, and testing the shims is very time consuming. One must typically wait a period of time to cool down the parts before attempting to perform a "shimming".

Regarding the Teflon platen cover: In spite of the fact that tension is applied to pull the cover taught over the surface of the upper platen, when the top platen elevates each cycle, small gaps of air separate the platen cover from the heat platen. This condition produces wide platen cover surface temperatures variations that result in inconsistent diameters of pressed product.

Regarding the pressing/heating plate, if the pressing plate is too thin, the process of bolting the plates warps the pressing plate, resulting in uneven heat transfer. A thicker pressing plate is therefore necessary to avoid warping. A thicker pressing plate, however, also results in problems with heat transfer when separated from the heating plate by shims.

Other prior art systems use thin pressing plates held by edge clamps to hold the backing plate to the heating plate; however, these systems have bad contact across the width resulting in inconsistent heat transfer and poor roundness and size control.

Further regarding Teflon platen covers, platen covers rapidly wear out under the heat and pressure conditions of the press. Even when not fully worn out, the platen cover can develop defective areas or holes. Replacing the platen cover is costly and time consuming, and requires that the press stop operation, causing lost production time. Moreover, when the platen is heated, replacement of the cover requires either that the press stop operation until the platen cools down or that employees risk being burned.

In an attempt to remedy the shortcomings of the prior art, U.S. Pat. No. 5,649,473, the entire contents of which are incorporated herein by reference, teaches a platen cover belt on spools positioned over the pressing plate. Once a portion of the cover belt is compromised, the cover belt can be advanced on the spools so that a new portion of the cover belt can be used. However, this system does not alleviate the need for placing shims between the bolted backing plate and heating plate. Moreover, the belt adds complexity and expense to the system.

Prior art also has the problem that when dough sticks to the Teflon platen cover it pulls against the bottom belt. This creates small air gaps between the platen cover and the Teflon platen cover belt that results in uneven temperature on the Teflon Platen cover belt. Uneven temperature, even in a properly shimmed press can produce shape and diameter irregularities. The precision shimming that is required to produce the best consistency changes depending upon the array of dough balls a producer wants to make. Smaller desired diameters are higher in number per cycle, while larger diameters are fewer in number per cycle. The result is a need to shim for each array that a producer wants to use if the best quality is desired. With many producers making array changes multiple times per day, the cost of re-shimming each array is quite high; so, either the quality is inconsistent with high productivity, or productivity is low with high quality.

What is needed is a better platen system that allows for fast placement of shims, easy removal and replacement of the pressing surface, improved heat transfer characteristics, and close and uniform contact between the plates and shims.

BRIEF SUMMARY OF THE INVENTION

Accordingly, the present invention is directed to a dough forming apparatus comprising a lower support frame, a lower pressing platen coupled to the lower support frame, an upper pressing platen assembly comprising a backing structure, an upper backing platen coupled to the backing structure, the upper backing platen having a cover side, one or more heater channels formed throughout the upper backing platen, and a pressing plate removably coupled to the cover side of the upper backing platen by vacuum or electromagnetic means. One or more heating elements may be positioned inside of the heater channels. A conveyor supported by the lower support frame is positioned to pass between the lower pressing platen and the upper pressing platen assembly.

In an embodiment of the present invention, the upper backing platen further comprises a geometry of grooves disposed upon the cover side and a vacuum hole comprising an opening in the cover side in fluid communication with one or more grooves, and the pressing plate is removably coupled to the cover side of the upper backing platen by vacuum means.

In another embodiment, the upper backing platen further comprises a notch around a perimeter of the upper backing platen, a plurality of edge members removably coupled to the upper backing platen in the notch, and a gasket removably held between the upper backing platen and the plurality of edge members. The gasket is configured to preserve the vacuum between the upper backing platen and the pressing plate.

In another embodiment, the lower pressing platen comprises a lower backing platen coupled to the lower support frame, and a lower pressing plate removably coupled to the lower backing platen by a vacuum.

Preferably, one or more shims are disposed between the pressing plate and the cover side of the upper backing platen. One or more of the shims may be circular. Preferably, the pressing plate has a lip for aligning the pressing plate on the upper backing platen.

Additionally, the present invention is directed to a method for adjusting an apparatus as described above, the method comprising the steps of lowering the upper backing platen assembly to a lowered position, disabling the vacuum to release the pressing plate from the upper backing platen and onto the conveyor, raising the upper backing platen to a raised position, moving the conveyor to advance the pressing plate from under the upper backing platen, placing one or more shims on the pressing plate, reversing the conveyor to return the pressing plate under the upper backing platen, lowering the upper pressing platen assembly to the lowered position, and enabling the vacuum to couple the pressing plate to the upper backing platen. The method may also include the step of indexing the position of the conveyor after the raising step, and returning the conveyor to the indexed position during the reversing step.

BRIEF DESCRIPTION OF THE DRAWINGS

A better understanding of the present invention will be had with reference to the accompanying drawings in which.

DETAILED DESCRIPTION OF THE INVENTION

The invention solves the shortcomings of the prior art by providing an upper pressing platen assembly having a pressing plate removably coupled to an upper backing platen. The upper pressing platen assembly permits placement of shims between the pressing plate and the upper backing platen. In a preferred embodiment of the present invention, the pressing plate is held against the upper backing platen by vacuum suction as discussed below.

Figure 1:
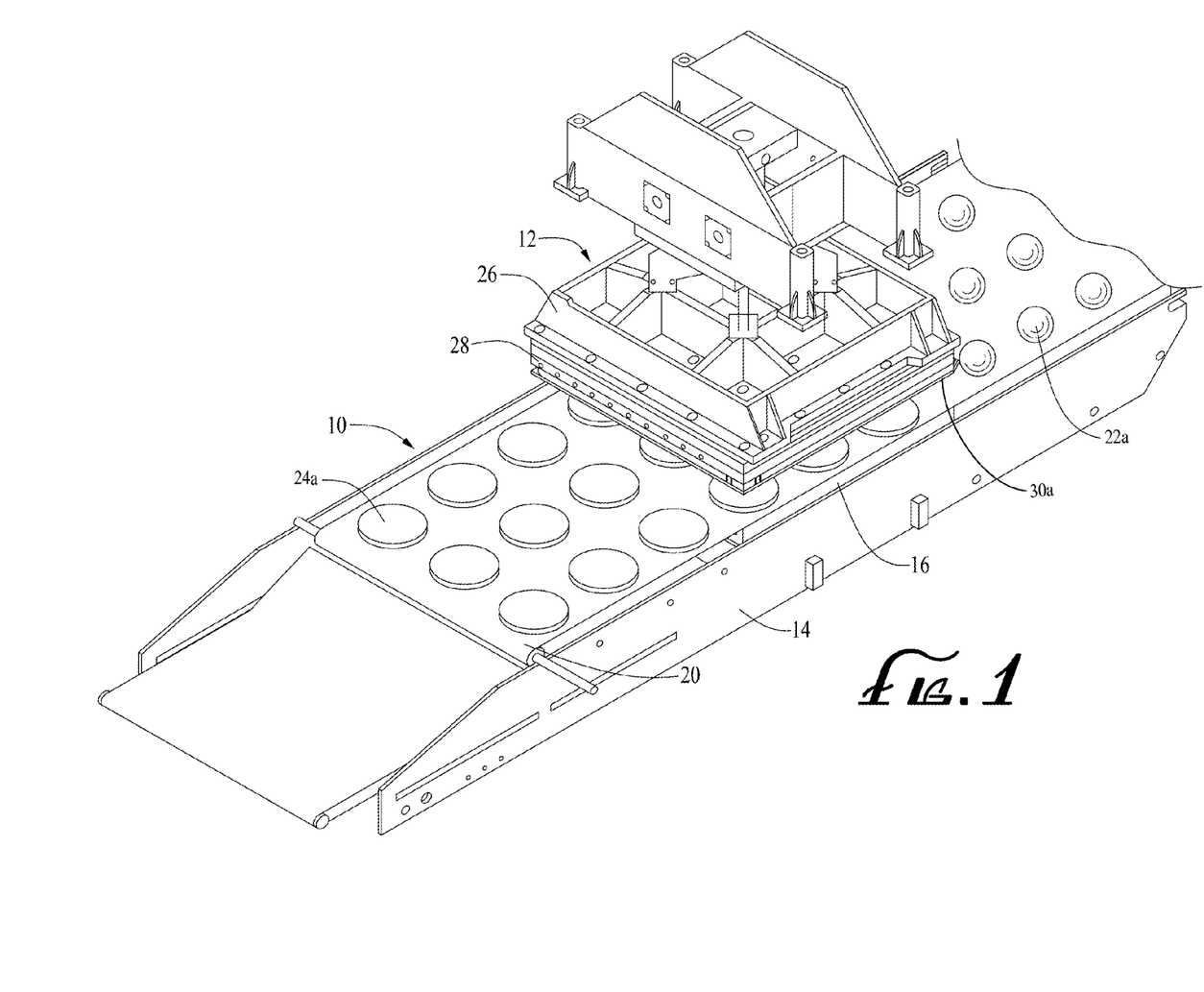
FIG. 1 is a perspective view of a press according to an embodiment of the present invention showing dough ball pressing.

An overview of a dough forming press 10 employing an upper vacuum pressing platen assembly 12 according to an embodiment of the present invention is shown in FIG. 1. The press 10 has a lower support frame 14. A lower pressing platen 16 is coupled to the lower support frame 14. The upper vacuum pressing platen assembly 12 is positioned above the lower pressing platen 16. A conveyor 20 supported by the lower support frame 14 passes between the lower pressing platen 16 and the upper vacuum pressing platen assembly 12.

A plurality of dough balls 22a are loaded onto the conveyor by a loader (not shown). The dough balls are moved between the lower platen 16 and a pressing plate 30a coupled to the upper vacuum pressing platen assembly 12 where they are pressed into flattened dough pieces 24a, such as tortillas.

The upper vacuum pressing platen assembly 12 will now be considered in more detail with reference to FIGS. 2 to 7. The upper vacuum pressing platen assembly 12 has a backing structure 26. On the backing structure 26 is mounted an insulation plate (not shown) and an upper backing platen 28. As will be understood by those skilled in the art, the upper backing platen 28 can be a unitary structure or separate structures coupled together. A pressing plate 30 is removably coupled to the upper backing platen 28.

With reference to FIGS. 2 to 7, the upper backing platen has a cover side 32. A vacuum across the cover side 32 of the upper backing platen 28 is created by suction through a vacuum hole 34 in the center of the upper backing platen 28. Uniformity of the vacuum is facilitated by a continuous geometry of grooves 36 on the cover side 32 of the upper backing platen 28. The grooves 36 are preferably formed in fluid communication in a checkered pattern, with at least one groove being in fluid communication with the vacuum hole 34. However, those skilled in the art will recognize that the geometry of grooves 36 can be formed in other patterns, such as circular or annular patterns, that allow the vacuum to couple the pressing plate 30 to the upper backing platen 28. The vacuum constitutes one possible means for coupling the pressing plate 30 to the upper backing platen 28. Electromagnetic means are also possible.

Figure 2:
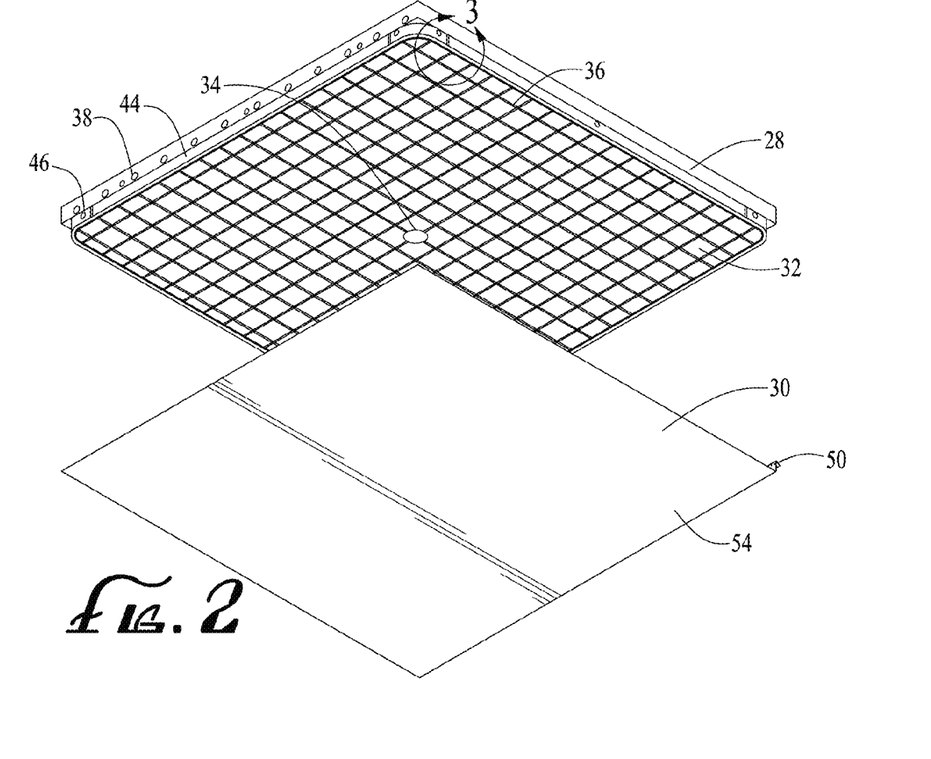
FIG. 2 is an exploded perspective view of an upper backing platen (without seal) and pressing plate usable in the press of FIG. 1.
Figure 3:
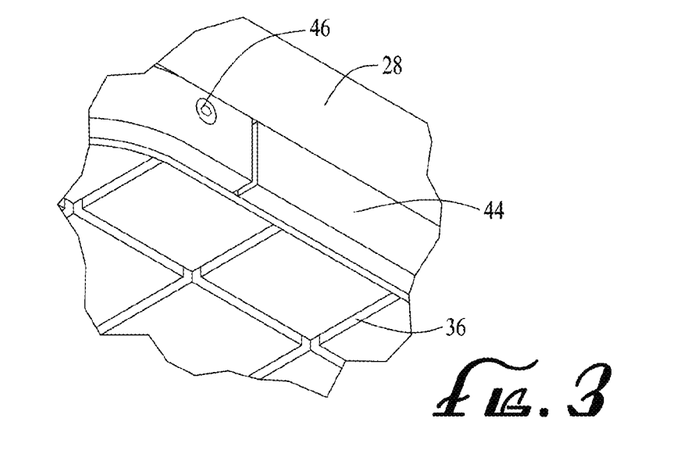
FIG. 3 is a detailed view of the upper backing platen (without seal) of FIG. 2 taken along line 3-3.

Heater channels 38 are formed throughout the upper backing platen 28, such as by drilling. A means for heating the upper backing platen, such as heating elements, (not shown) may be mounted in the channels 38 using, for example, an adhesive. Such a construction is advantageous, because broken heating elements can be removed from the channels 38 and replaced. Additionally, individual heating elements can be separately and variably controlled. Alternatively, a circular or annular heater may be routed inside a circular shaped channel formed in the upper backing platen 28.

In an alternative embodiment, the heater utilizes a recirculated fluid such as oil heated by a heat source. In this embodiment, a heated fluid is pumped through the channels 38 by a pump (not shown). The channels may have a variety of different shapes to distribute the heated fluid through the upper backing platen 28 so as to either heat the platen uniformly or to variably heat particular portions of the upper backing platen 28. For example, the channels 38 may be serpentine, or circular. This type of heater is advantageous because it allows for uniform heating of the platen.

Figure 6:
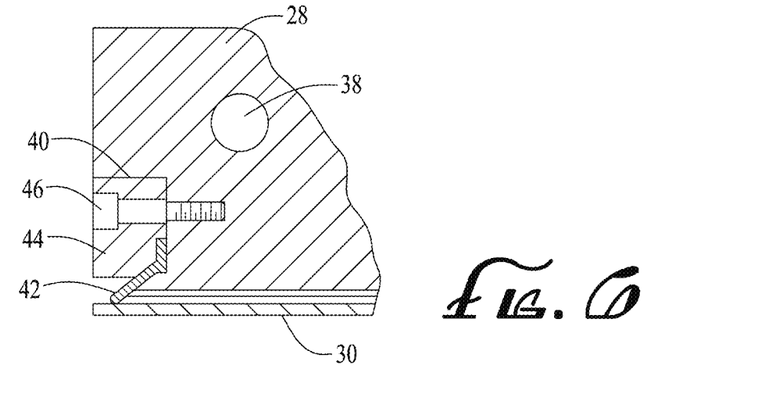
FIG. 6 is a cross sectional view of the portion of the upper backing platen and pressing plate of FIG. 5 bounded by the line 6-6.
Figure 7:
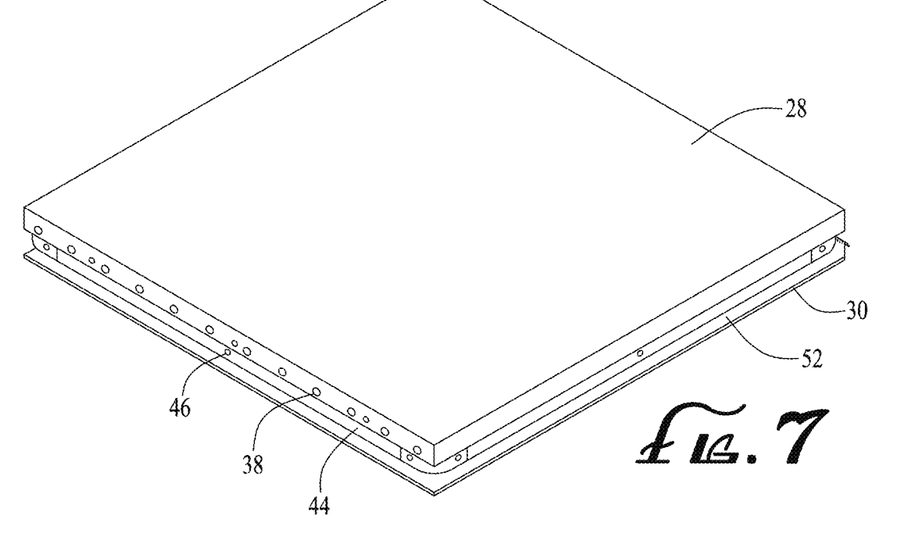
FIG. 7 is a top perspective view of the upper backing platen and pressing plate of FIG. 2.

Additionally, as shown in FIG. 6, the upper backing platen 28 further comprises a notch 40 along a perimeter for placement of a seal 42. The seal 42 can be a gasket. The seal 42 is oriented so that upon coupling of the pressing plate 30 to the upper backing platen 28, air is prevented from entering between the pressing plate 30 and the upper backing platen 28. The seal 42 is placed in the notch 40 around the upper backing platen 28, and a plurality of edge members 44 are removably attached to the upper backing platen 28 to hold the seal 42 in place. Preferably, the edge members 44 are held in place using fasteners 46, such as bolts, so that the edge members 44 clamp the seal 42 in place allowing removal and replacement as necessary.

Figure 8A:
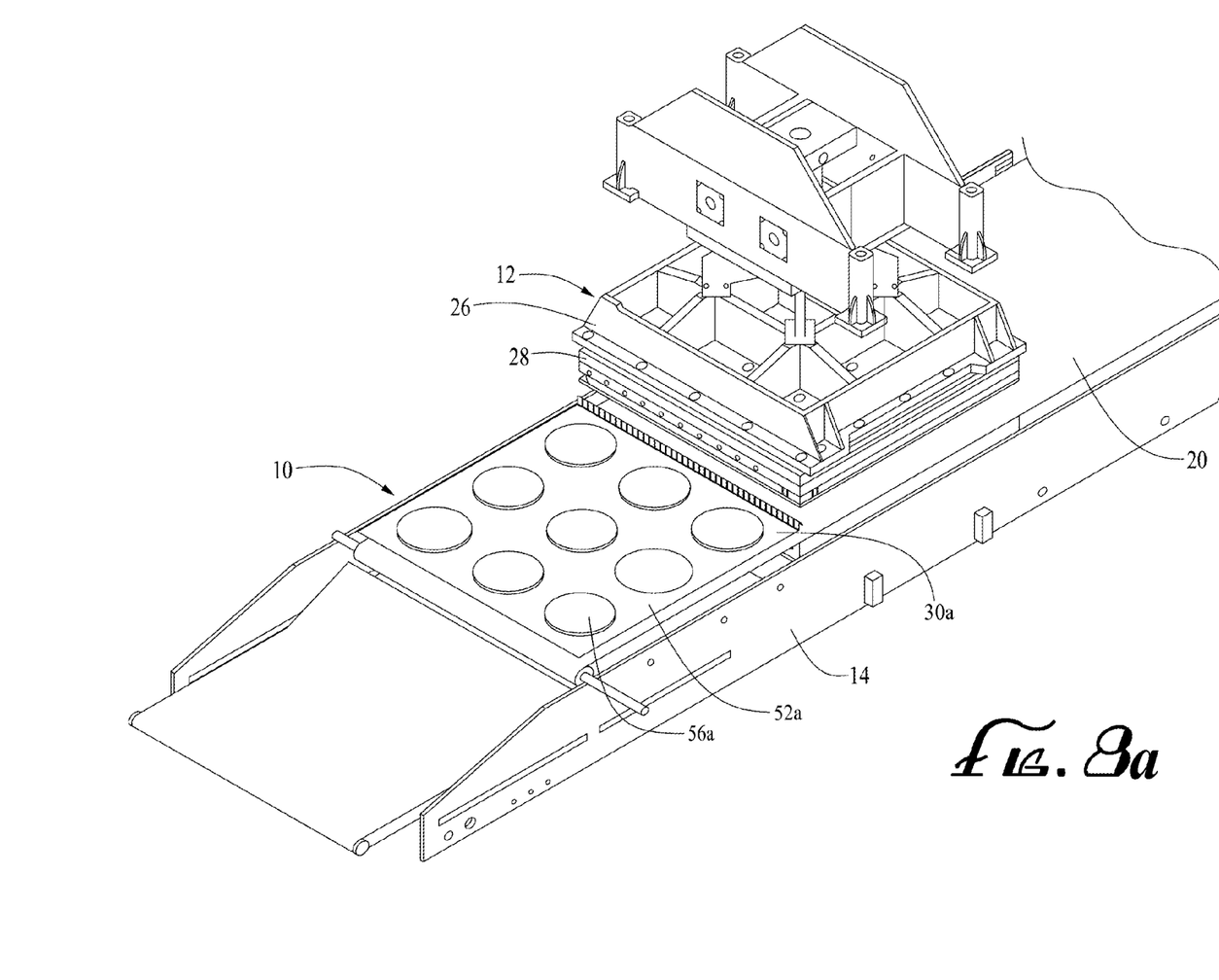
FIGS. 8A-D show perspective views of a press according to an embodiment of the present invention showing shim placement on a pressing plate and a second pressing plate.
Figure 9:
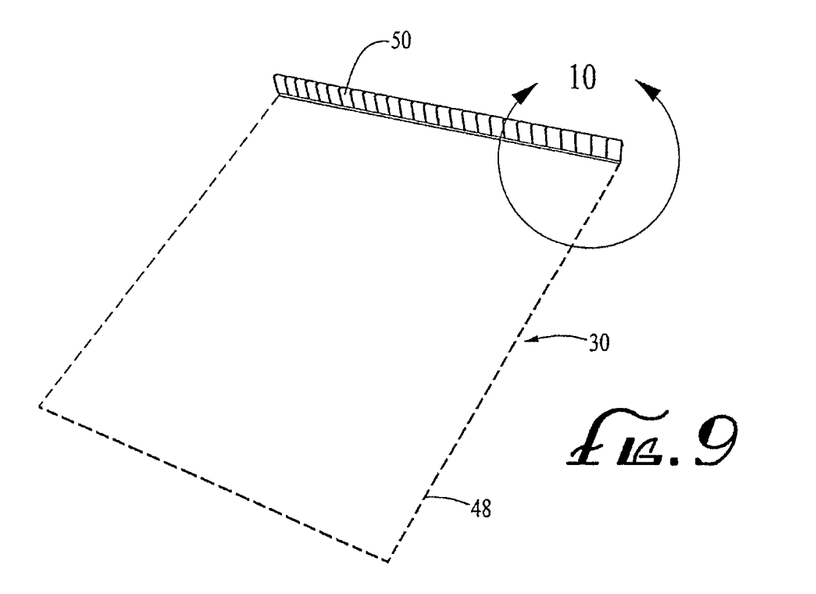
FIG. 9 is a top perspective view of a pressing plate usable in the press of FIG. 1.
Figure 10:
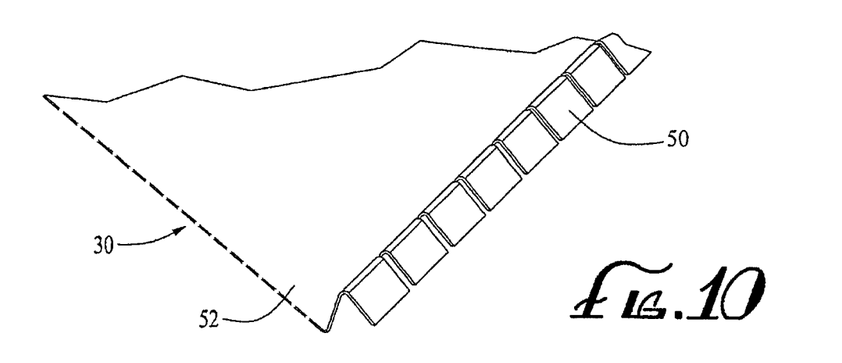
FIG. 10 is a detailed view of the pressing plate of FIG. 9 taken along line 10-10.

With reference to FIGS. 2, 8A and 9, in one preferred embodiment the pressing plate 30a has a contact portion 48 and an optional lip 50. The contact portion 48 has a platen side 52a and a dough side 54. Preferably, the pressing plate 30a is made of aluminum or stainless steel. Those skilled in the art will recognize that the pressing plate 30a can be made from other materials known in the art to be capable of withstanding the heat and pressure of dough pressing.

Figure 4:
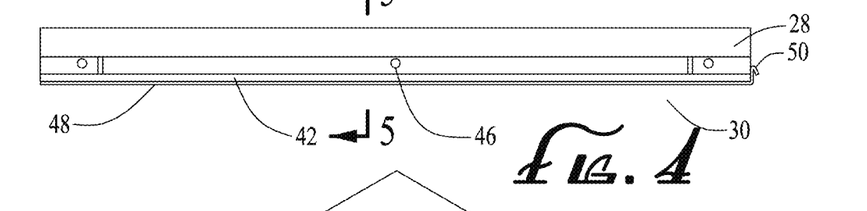
FIG. 4 is a side elevation view of the upper backing platen and pressing plate of FIG. 2 in an assembled condition.
Figure 5:
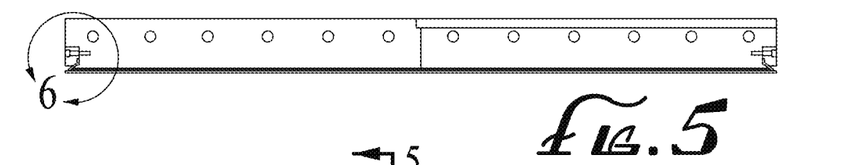
FIG. 5 is a cross sectional view of the upper backing platen (with seal) and pressing plate of FIG. 4 taken along line 5-5.

Preferably, but optionally, the dough side 54 is coated with a non-stick material, such as Teflon®. The optional lip 50 is usable to orient the pressing plate 30 relative to the upper backing platen 28. With reference to FIGS. 2 and 4, when installed, the grooved cover side 32 of the upper backing platen 28 contacts the platen side 52 of the pressing plate 30, and the lip 50 of the pressing plate 30 is positioned along a side of upper backing platen 28.

Shims 56a are placed as desired between the platen side 52a of the pressing plate 30a, and the cover side 32 of the upper backing platen 28. A small quantity of heat sink compound (not shown) may be used to lock each shim 56a in place, and improve heat transfer. When a vacuum is introduced through the vacuum hole 34, the pressing plate 30a and the shims 56a are held tightly against the cover side 32 of the upper backing platen 28. Because the pressing plate 30a is relatively thin compared to prior art, improved heat conduction characteristics result over prior art systems. Additionally, quick change of the pressing plate 30a and/or shims 56a is possible.

The present invention is also directed to an improved method of shimming a press. Initially, the upper pressing platen assembly is moved to a lowered position, wherein the pressing plate 30a is in contact with the conveyor 20. The vacuum is then disabled to release the pressing plate 30a from the upper backing platen 28 and onto the conveyor 20. The upper backing platen 28 is then raised to a raised position.

Once the upper backing platen 28 is out of the way, an index position for the conveyor 20 is recorded and the conveyor 20 is moved to advance the pressing plate from under the upper backing platen. In FIG. 8A, the pressing plate 30a is shown on the conveyor 20 after having been moved out from under the upper backing platen 28.

Once the pressing plate 30a is out from under the upper backing platen 28, the pressing plate 30a can be changed, as shown in FIGS. 8A-D, or the shims 56a adjusted as desired. The conveyor is then used to move the pressing plate 30a under the upper backing platen 28 to the index position. The upper pressing platen assembly is again moved to the lowered position such that the upper backing platen 28 contacts the shims 56a and platen side 52a of the pressing plate 30a. The vacuum is enabled and the pressing plate 30a is held tight to the upper backing platen 28 during heating and pressing.

When changing the pressing plate 30a, the upper pressing platen assembly is moved to a lowered position, wherein the pressing plate 30a is in contact with the conveyor 20. The vacuum is then disabled to release the pressing plate 30a from the upper backing platen 28 and onto the conveyor 20. The upper backing platen 28 is then raised to a raised position.

Figure 8B:
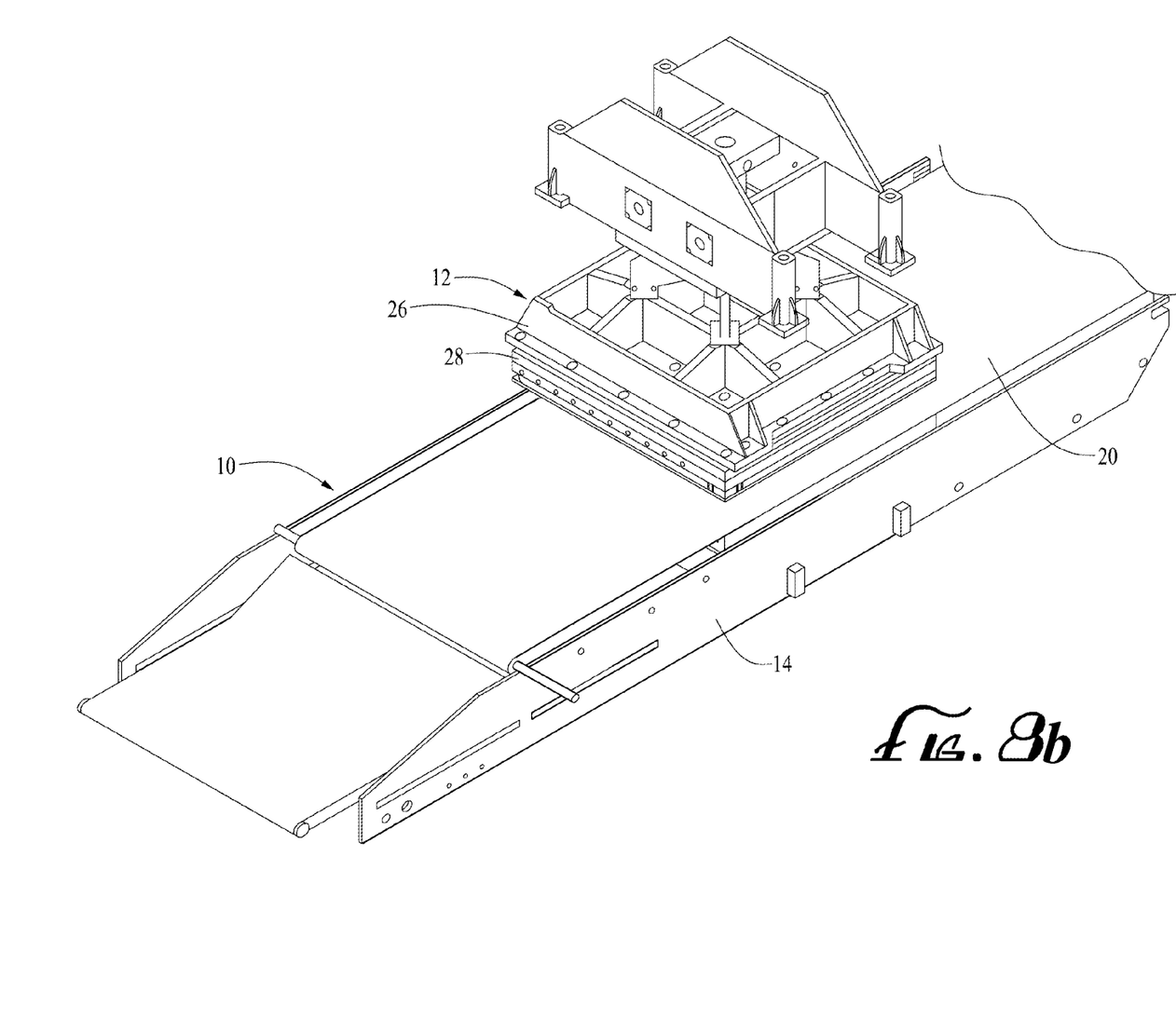
Figure 8C:
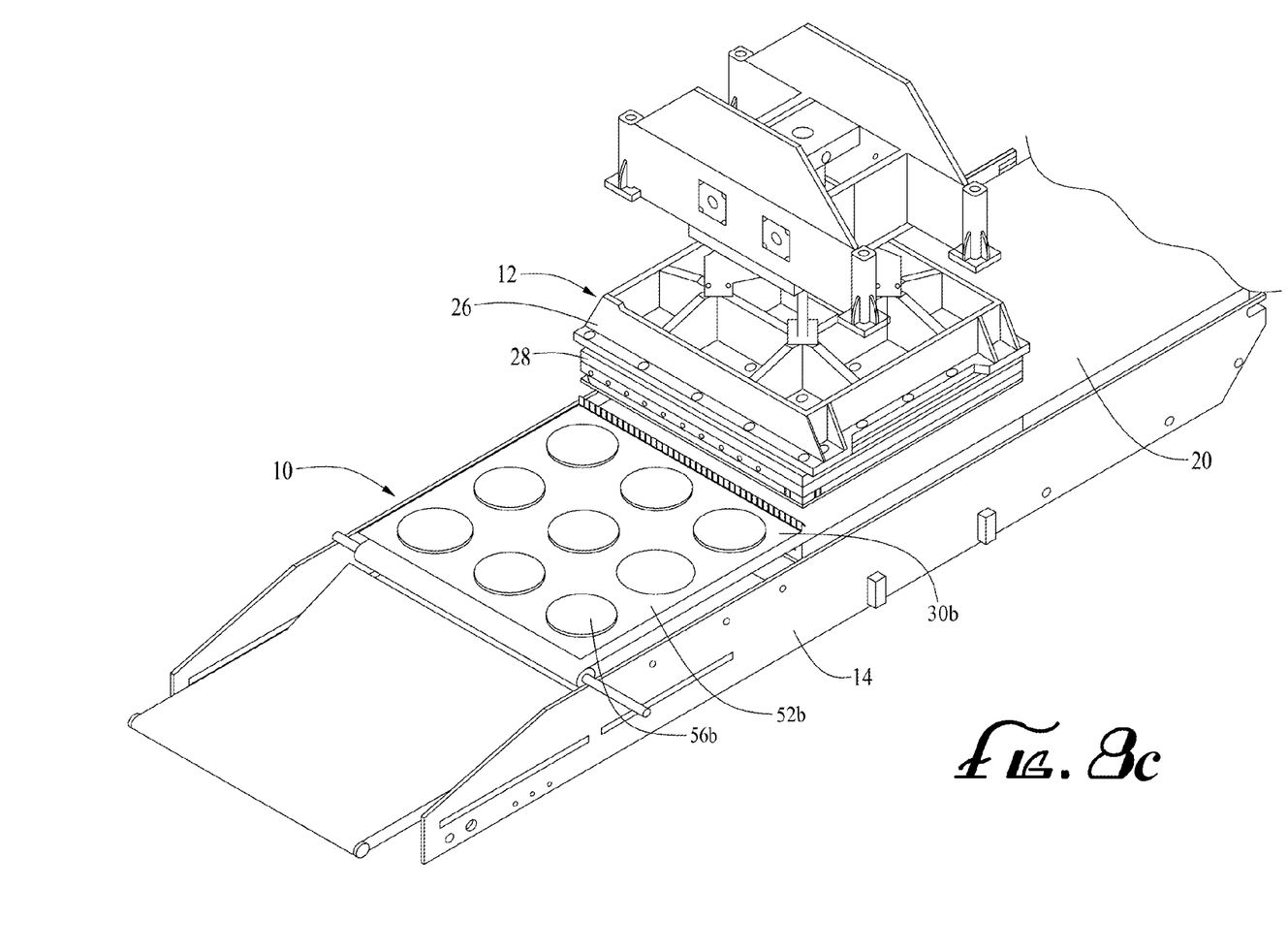

Once the upper backing platen 28 is out of the way, an index position for the conveyor 20 is recorded and the conveyor 20 is moved to advance the pressing plate from under the upper backing platen. In FIG. 8A, the pressing plate 30a is shown on the conveyor 20 after having been moved out from under the upper backing platen 28. The pressing plate 30a is then removed from the conveyor 20, as shown in FIG. 8B, and another pressing plate 30b is placed on the conveyor, as shown in FIG. 8C.

Other shims 56b are placed as desired between a platen side 52b of the other pressing plate 30b, and the cover side 32 of the upper backing platen 28. A small quantity of heat sink compound (not shown) may be used to lock each shim 56b in place, and improve heat transfer.

Figure 8D:
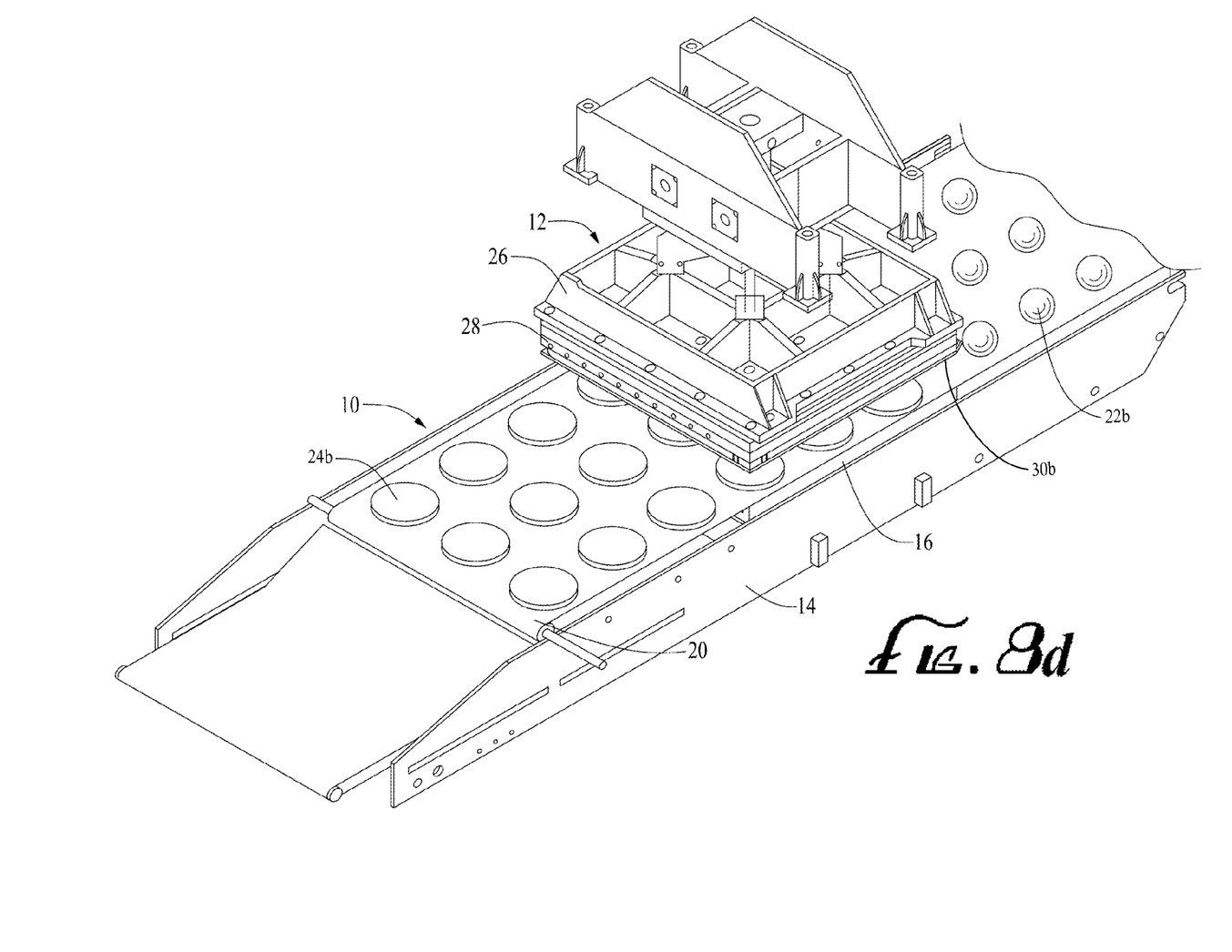

The conveyor is then used to move the other pressing plate 30b under the upper backing platen 28 to the index position. The upper pressing platen assembly is again moved to the lowered position such that the upper backing platen 28 contacts the other shims 56b and platen side 52b of the other pressing plate 30b. The vacuum is enabled and the other pressing plate 30b is held tight to the upper backing platen 28 during heating and pressing of another plurality of dough balls 22b to create other flattened dough pieces 24b, as shown in FIG. 8D.

To remove the pressing plate 30a, a reverse pressure may be used to release the pressing plate 30a from engagement with the upper backing platen 28. A means for aligning the pressing plate 30a may be used to ensure that the pressing plate 30a has been returned to the index position. For example, a sensor can check for rotation of the pressing plate 30a as shown by mis-registration of the lip 50. A laser alignment tool could be used for this purpose.

The system of the present invention allows for very quick pressing plate 30a changing and shim 56a adjustment. There is no time lost to let the upper backing platen 28 cool down and there is little time lost in fastening and unfastening the pressing plate 30a. Moreover, the use of a vacuum to hold the pressing plate 30a to the upper backing platen 28 avoids warpage of either the pressing plate 30a or the upper backing platen 28 and thereby avoids the shortcomings of the prior art. Testing shows dramatic improvement over prior art systems, in which typical pressing plate change and shim adjustment could take hours, while with the present invention the process can be accomplished in minutes.

The system of the present invention allows for very quick pressing plate 30 changing and shim 56 adjustment. There is no time lost to let the upper backing platen 28 cool down and there is little time lost in fastening and unfastening the pressing plate 30. Moreover, the use of a vacuum to hold the pressing plate 30 to the upper backing platen 28 avoids warpage of either the pressing plate 30 or the upper backing platen 28 and thereby avoids the shortcomings of the prior art. Testing shows dramatic improvement over prior art systems, in which typical pressing plate change and shim adjustment could take hours, while with the present invention the process can be accomplished in minutes.

Figure 11:
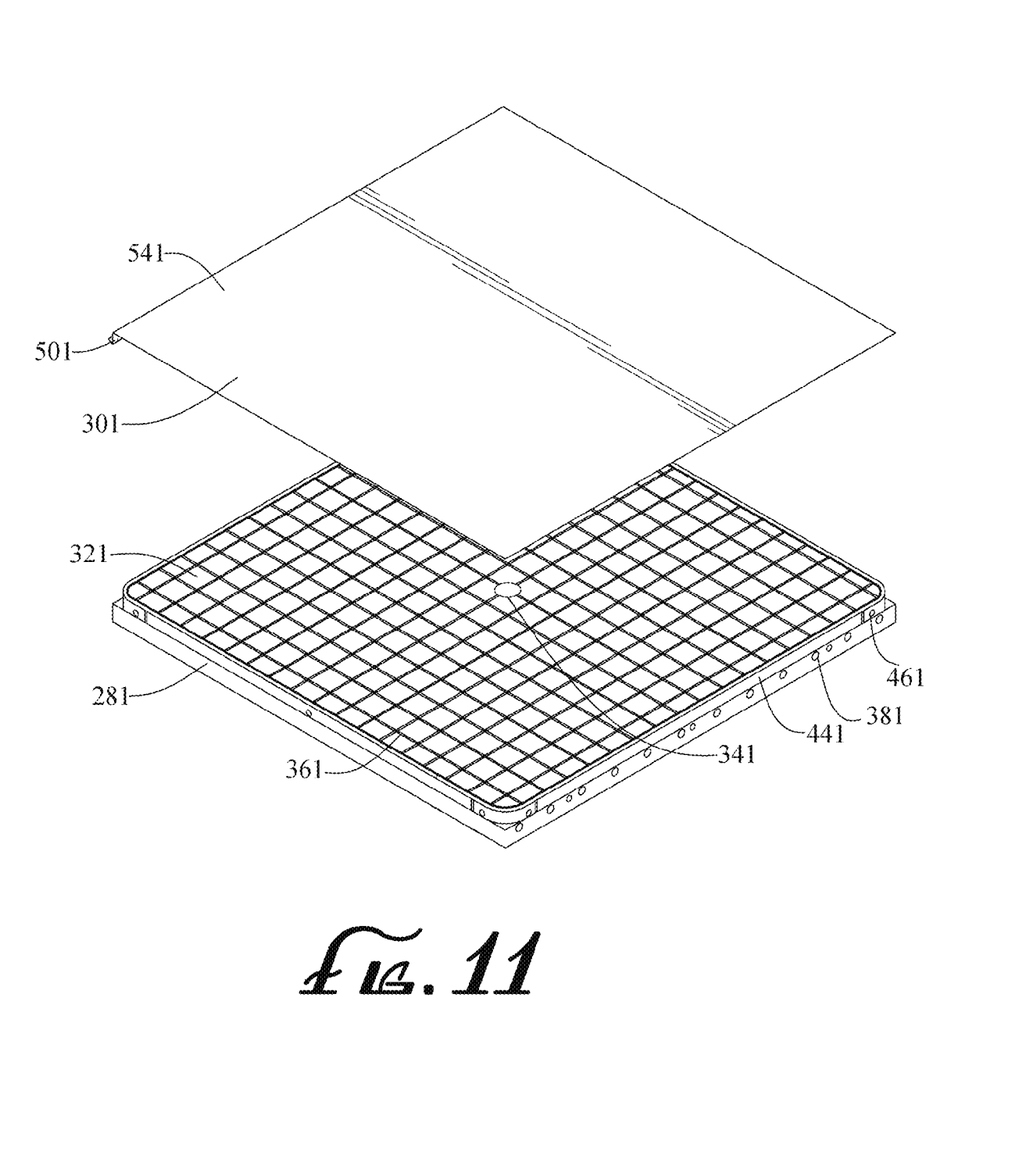
FIG. 11 is an exploded perspective view of a lower backing platen (without seal) and pressing plate usable as a lower pressing platen, in a further embodiment.

With reference to FIG. 11, in a further embodiment, lower pressing platen 16 may comprise a vacuum pressing platen assembly, either in addition to upper vacuum pressing platen assembly 12, or instead (in which later case the upper vacuum pressing assembly 12 could be replaced with a pressing platen, not shown). In this embodiment, a lower vacuum pressing platen assembly would comprise a lower backing platen 281 similar in construction to upper backing platen 28. As will be understood by those skilled in the art, the lower backing platen 281 can be a unitary structure or separate structures coupled together. A lower pressing plate 301 similar to pressing plate 30 is removably coupled to the lower backing platen 281.

The lower backing platen has a cover side 321. A vacuum across the cover side 321 of the lower backing platen 281 is created by suction through a vacuum hole 341 in the center of the lower backing platen 281. Uniformity of the vacuum is facilitated by a continuous geometry of grooves 361 on the cover side 321 of the lower backing platen 281. The grooves 361 are preferably formed in fluid communication in a checkered pattern, with at least one groove being in fluid communication with the vacuum hole 341. However, those skilled in the art will recognize that the geometry of grooves 361 can be formed in other patterns, such as circular or annular patterns, that allow the vacuum to couple the lower pressing plate 301 to the lower backing platen 281. The vacuum constitutes one possible means for coupling the lower pressing plate 301 to the lower backing platen 281. Electromagnetic means are also possible.

As with the upper assembly, heater channels 381 can be formed throughout the lower backing platen 281. Similarly, a means for heating the lower backing platen, such as heating elements, (not shown) may be mounted in the channels 381.

Similar to the upper backing platen 28, a plurality of edge members 441 are removably attached to the lower backing platen 281 to hold a seal (not shown, but similar to seal 42) in place. Preferably, the edge members 441 are held in place using fasteners 461, such as bolts, so that the edge members 441 clamp the seal in place allowing removal and replacement as necessary.

In one preferred embodiment, the lower pressing plate 301 has an optional lip 501, and a dough side 541. Preferably, the lower pressing plate 301 is made of aluminum or stainless steel. Those skilled in the art will recognize that the lower pressing plate 301 can be made from other materials known in the art to be capable of withstanding the heat and pressure of dough pressing.

Preferably, but optionally, the dough side 541 is coated with a non-stick material, such as Teflon®. The optional lip 501 is usable to orient the lower pressing plate 301 relative to the lower backing platen 281.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

As used herein, the term "coupled" means connected, such as by a pair of forces acting in parallel but opposite directions, or with a fastener, connector, adhesive, or weld, and also includes structures that are integrally formed.

Any element in a claim that does not explicitly state "means" for performing a specified function or "step" for performing a specified function, should not be interpreted as a "means" or "step" clause as specified in 35 U.S.C. §112.

The invention claimed is:

1. A dough forming apparatus comprising:
   a lower support frame;
   a lower pressing platen coupled to the lower support frame;
   an upper pressing platen assembly comprising:
      a backing structure;
      an upper backing platen coupled to the backing structure, the upper backing platen having a pressing plate side;
      one or more heater channels formed throughout the upper backing platen; and
      a pressing plate having a platen side, the platen side removably coupled to the pressing plate side of the upper backing platen by vacuum or electromagnetism;
   a heater in thermal communication with the one or more heater channels in order to heat the upper backing platen;
   a conveyor supported by the lower support frame and positioned to pass between the lower pressing platen and the upper pressing platen assembly and below the pressing plate; and
   two or more shims located between the platen side of the pressing plate and the pressing plate side of the platen and held in place between the platen side of the pressing plate and the pressing plate side of the platen when the pressing plate is coupled to the platen, each of the two or more shims being circular and positioned between the platen side of the pressing plate and the pressing plate side of the platen such that each of the two or more shims substantially aligns with a corresponding dough product located on the conveyor when the pressing plate applies pressure to the dough product.

2. The dough forming apparatus of claim 1 wherein:
   the upper backing platen further comprises a geometry of grooves disposed upon the pressing plate side and a vacuum aperture comprising an opening in the pressing plate side in fluid communication with one or more grooves; and
   the pressing plate is removably coupled to the pressing plate side of the upper backing platen by the vacuum.

3. The dough forming apparatus of claim 1 wherein the upper backing platen further comprises:
   a notch around a perimeter of the upper backing platen;
   a plurality of edge members removably coupled to the upper backing platen in the notch; and
   a gasket removably held between the upper backing platen and the plurality of edge members;
   wherein the gasket is configured to preserve the vacuum between the upper backing platen and the pressing plate.

4. The dough forming apparatus of claim 1 wherein the pressing plate comprises a lip for aligning the pressing plate on the upper backing platen.

5. The dough forming apparatus of claim 1, where the lower pressing platen comprises a lower backing platen coupled to the lower support frame, and a lower pressing plate removably coupled to the lower backing platen by a vacuum.

6. The dough forming apparatus of claim 1, further comprising one or more heating elements positioned inside of at least one of the heater channels.

7. The dough forming apparatus of claim 1, wherein the pressing plate has a dough side, the dough side comprising a coating of a material with non-stick characteristics.

8. A dough forming apparatus comprising:
   a conveyor for transporting dough balls; and
   a vacuum pressing platen assembly in intermittent contact with the conveyor, comprising:
      a backing platen;
      a pressing plate having a pressing surface with a flatness;
      means for removably coupling the pressing plate to the backing platen by a vacuum;

a heater in thermal communication with one or more heater channels in the backing platen in order to heat the backing platen; and two or more spacers located between the pressing plate and the backing platen and held in place between the pressing plate and the backing platen when the pressing plate is coupled to the backing platen, each of the two or more spacers being circular and positioned between the pressing plate and the backing platen such that each of the two or more spacers substantially aligns with a corresponding dough ball located on the conveyor when the pressing plate applies pressure to the corresponding dough ball.

9. The dough forming apparatus of claim 8, further comprising means for heating the pressing plate.

10. A dough forming apparatus comprising:
a lower support frame;
a lower pressing platen coupled to the lower support frame;
an upper pressing platen assembly comprising:
    a backing structure;
    an upper backing platen coupled to the backing structure, the upper backing platen having a pressing plate side;
    one or more heater channels formed throughout the upper backing platen; and
    a pressing plate having a platen side, the platen side removably coupled to the pressing plate side of the upper backing platen by vacuum;
a heater in thermal communication with the one or more heater channels in order to heat the upper backing platen;
a conveyor supported by the lower support frame and positioned to pass between the lower pressing platen and the upper pressing platen assembly and below the pressing plate; and
two or more spacers located between the platen side of the pressing plate and the pressing plate side of the platen and held in place between the platen side of the pressing plate and the pressing plate side of the platen when the pressing plate is coupled to the platen, each of the two or more spacers being circular and positioned between the platen side of the pressing plate and the pressing plate side of the platen such that each of the two or more spacers substantially aligns with a corresponding dough product located on the conveyor when the pressing plate applies pressure to the dough product.

11. The dough forming apparatus of claim 10, wherein the upper backing platen includes one or more grooves in fluid communication with a vacuum aperture, each of the grooves defined in the pressing plate side of the upper backing platen, the vacuum aperture orthogonal to each of the grooves, and upon introduction of vacuum pressure in the grooves by the vacuum aperture, the vacuum pressure holds the pressing plate and the two or more spacers against the pressing plate side of the upper backing platen when the upper backing platen applies pressure to the products.

12. The dough forming apparatus of claim 11, wherein the upper backing platen further comprises a seal on the pressing plate side that preserves the vacuum pressure between the upper backing platen and the pressing plate.

13. The dough forming apparatus of claim 10, wherein the upper backing platen further comprises:
a notch around a perimeter of the upper backing platen;
a plurality of edge members located in the notch and removably coupled to the upper backing platen; and
a seal removably held between the upper backing platen and the plurality of edge members, wherein the seal is configured to preserve the vacuum pressure between the upper backing platen and the pressing plate.

14. The dough forming apparatus of claim 10, wherein the pressing plate comprises a lip for aligning the pressing plate to the upper backing platen.

15. The dough forming apparatus of claim 10, further comprising one or more heating elements positioned inside of at least one of the heater channels.

16. The dough forming apparatus of claim 10, wherein the pressing plate has a dough side opposite the platen side, the dough side comprising a coating of material with non-stick characteristics.

17. The dough forming apparatus of claim 2, wherein the upper backing platen further comprises a seal on the pressing plate side that preserves the vacuum between the upper backing platen and the pressing plate.

18. A dough forming apparatus comprising:
a platen having a pressing plate side and one or more heater channels defined in the platen;
a first pressing plate having a platen side, the platen side removably attachable to the pressing plate side of the platen by vacuum pressure or electromagnetism;
two or more first spacers positioned at different locations on the platen side of the first pressing plate and held in place between the platen side of the first pressing plate and the pressing plate side of the platen when the first pressing plate is attached to the platen, each of the two or more first spacers being circular and being positioned between the platen side of the first pressing plate and the pressing plate side of the platen when the first pressing plate applies pressure to a plurality of first dough products;
a second pressing plate having a platen side, the platen side removably attachable to the pressing plate side of the platen by vacuum pressure or electromagnetism; and
two or more second spacers positioned at different locations on the platen side of the second pressing plate and held in place between the platen side of the second pressing plate and the pressing plate side of the platen when the second pressing plate is attached to the platen, each of the two or more second spacers being circular and being positioned between the platen side of the second pressing plate and the pressing plate side of the platen when the second pressing plate applies pressure to a plurality of second dough products.

19. The dough forming apparatus of claim 18, wherein:
the platen side of the first or second pressing plates is removably attachable to the pressing plate side of the platen by vacuum pressure; and
the platen includes one or more grooves in fluid communication with a vacuum aperture, each of the grooves defined in the pressing plate side of the platen, the vacuum aperture orthogonal to each of the grooves, and upon introduction of vacuum pressure in the grooves by the vacuum aperture, the vacuum pressure holds the first or second pressing plate and the two or more first or second spacers against the pressing plate side of the platen when the first or second pressing plate applies pressure to the dough products.

20. The dough forming apparatus of claim 19, wherein the platen further comprises a seal on the pressing plate side that preserves the vacuum pressure between the platen and the first or second pressing plate.

21. The dough forming apparatus of claim 18, wherein the platen further comprises:

a notch around a perimeter of the platen;
a plurality of edge members located in the notch and removably coupled to the platen; and
a seal removably held between the platen and the plurality of edge members, wherein the seal is configured to preserve the vacuum pressure between the platen and the first or second pressing plate.

22. The dough forming apparatus of claim 18, wherein the first and second pressing plates comprise a lip for aligning the first and second pressing plates to the platen.

23. The dough forming apparatus of claim 18, further comprising one or more heating elements positioned inside of at least one of the heater channels.

24. The dough forming apparatus of claim 18, wherein the first pressing plate and the second pressing plates have a dough side opposite the platen side, the dough side comprising a coating of material with non-stick characteristics.

25. The dough forming apparatus of 18, wherein:
each of the two or more first spacers corresponds with one of the first dough products located on the conveyor assembly below the first pressing plate and the platen when the first pressing plate applies pressure to the first dough products; and
each of the two or more second spacers corresponds with one of the second dough products located on the conveyor assembly below the second pressing plate and the platen when the second pressing plate applies pressure to the second dough products.

* * * * *